Figure 3:
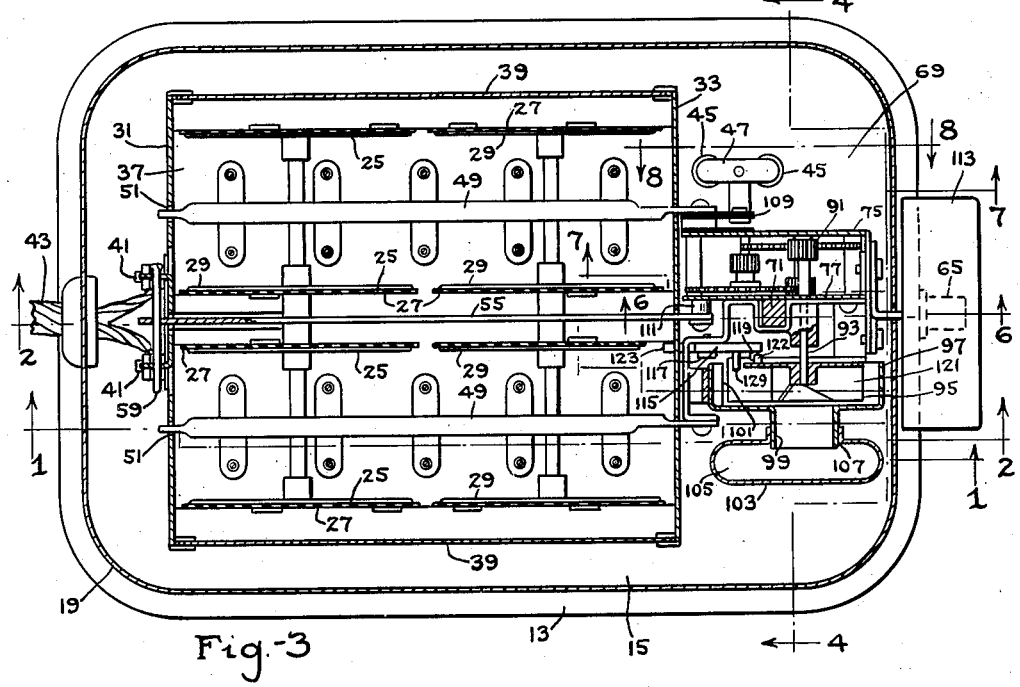

April 9, 1940.                M. IRELAND                2,196,394
                          AUTOMATIC TOASTER
                      Filed Feb. 13, 1939            5 Sheets-Sheet 1
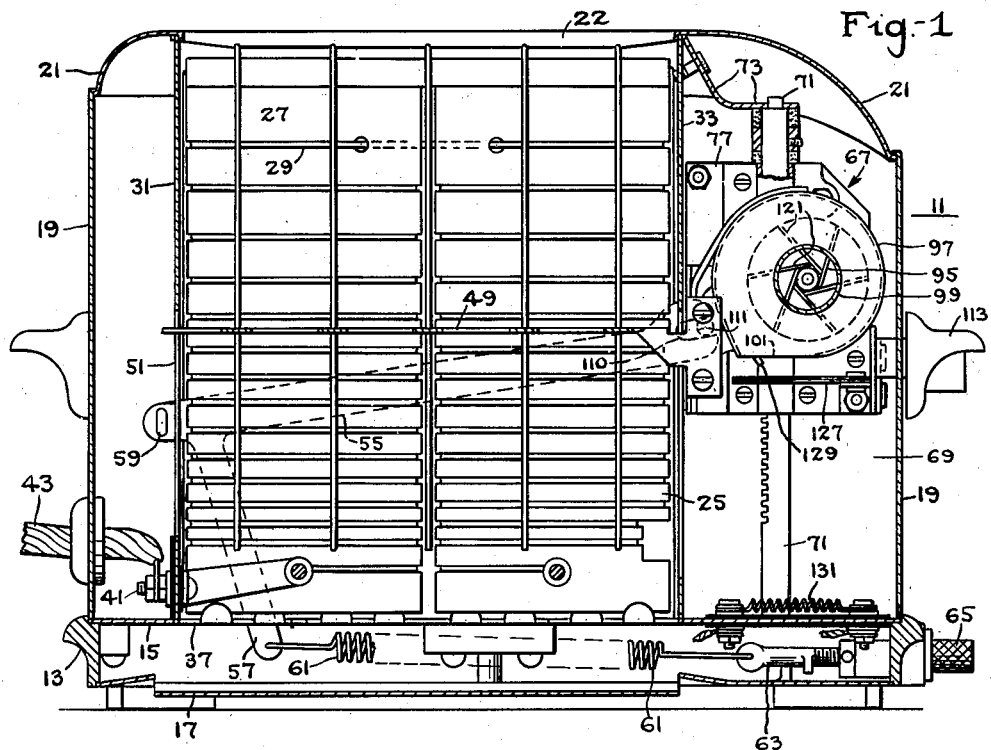
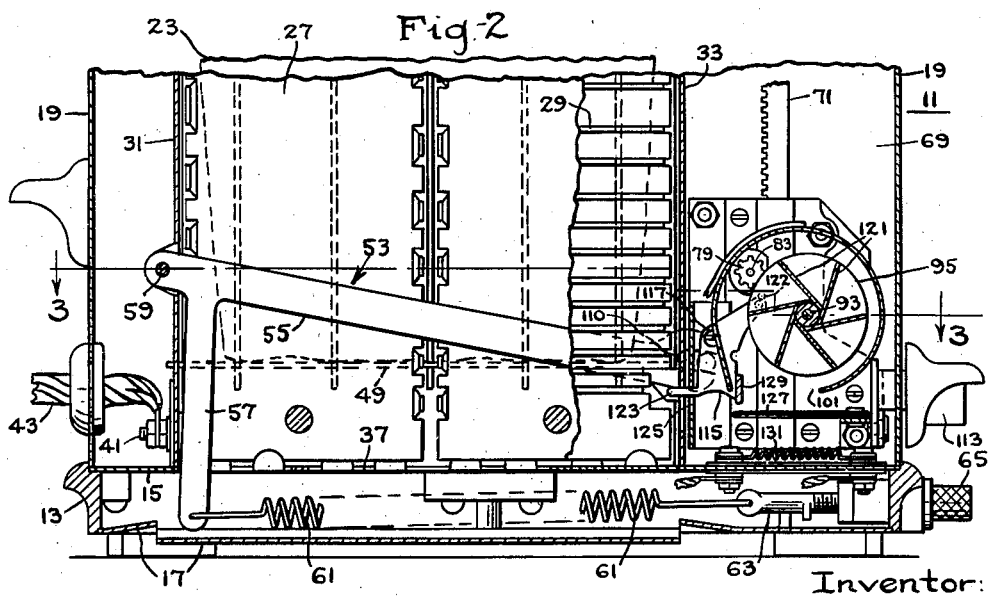
Inventor:
Murray Ireland.
By H M Biebel
    Attorney.

April 9, 1940.   M. IRELAND   2,196,394
AUTOMATIC TOASTER
Filed Feb. 13, 1939   5 Sheets-Sheet 2

Inventor:
Murray Ireland.
By H. M. Biebel
Attorney.

April 9, 1940.    M. IRELAND    2,196,394
AUTOMATIC TOASTER
Filed Feb. 13, 1939    5 Sheets-Sheet 3

Inventor:
Murray Ireland.
By H.M. Biebel
Attorney.

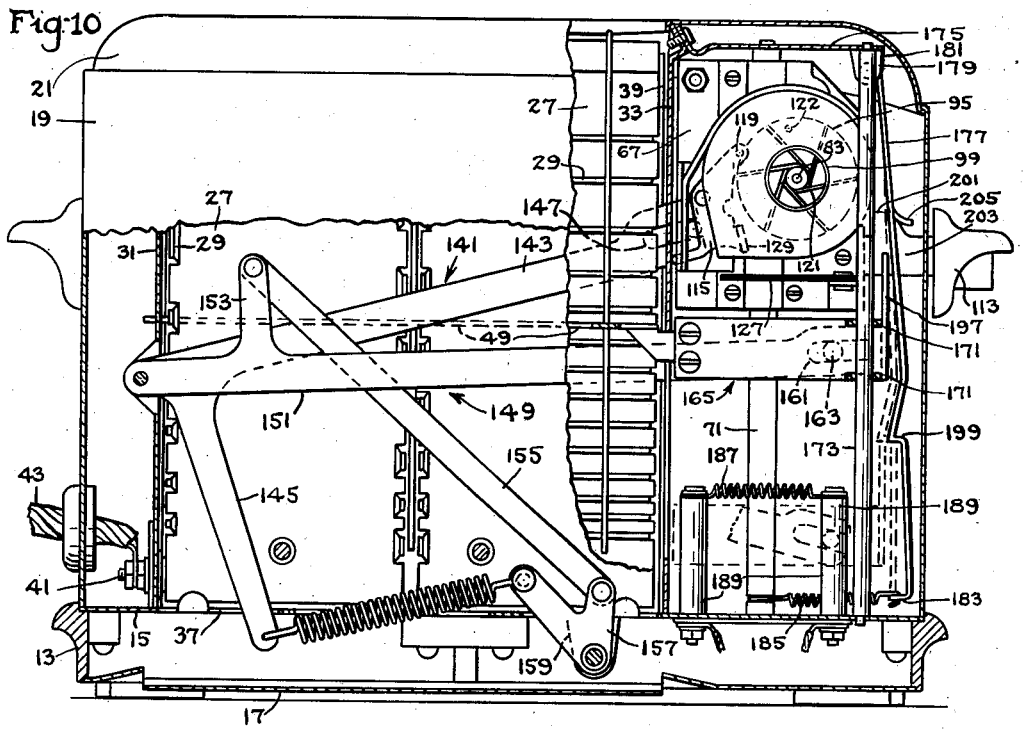
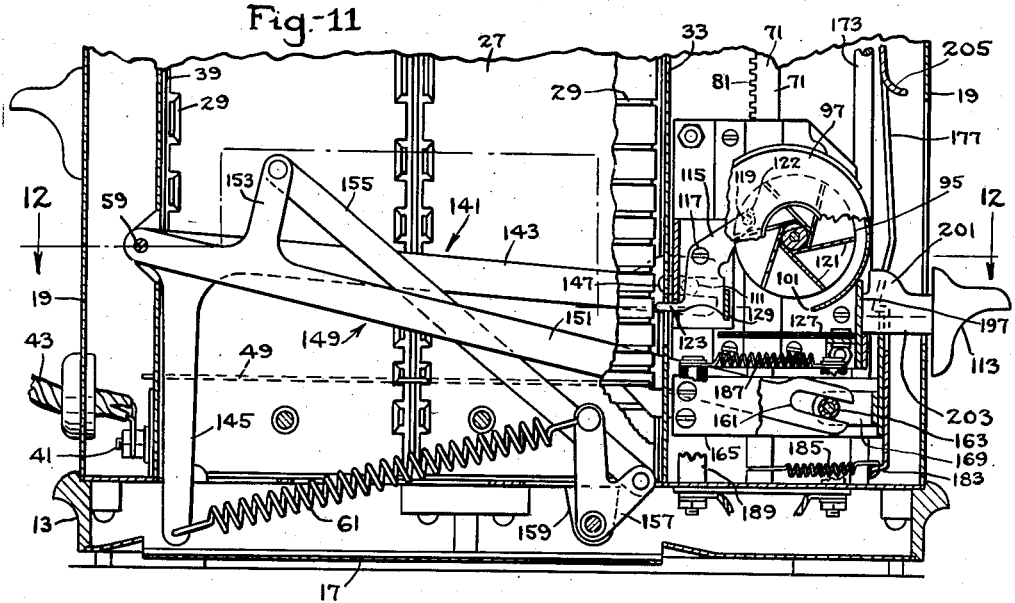

April 9, 1940.  M. IRELAND  2,196,394
AUTOMATIC TOASTER
Filed Feb. 13, 1939  5 Sheets-Sheet 5
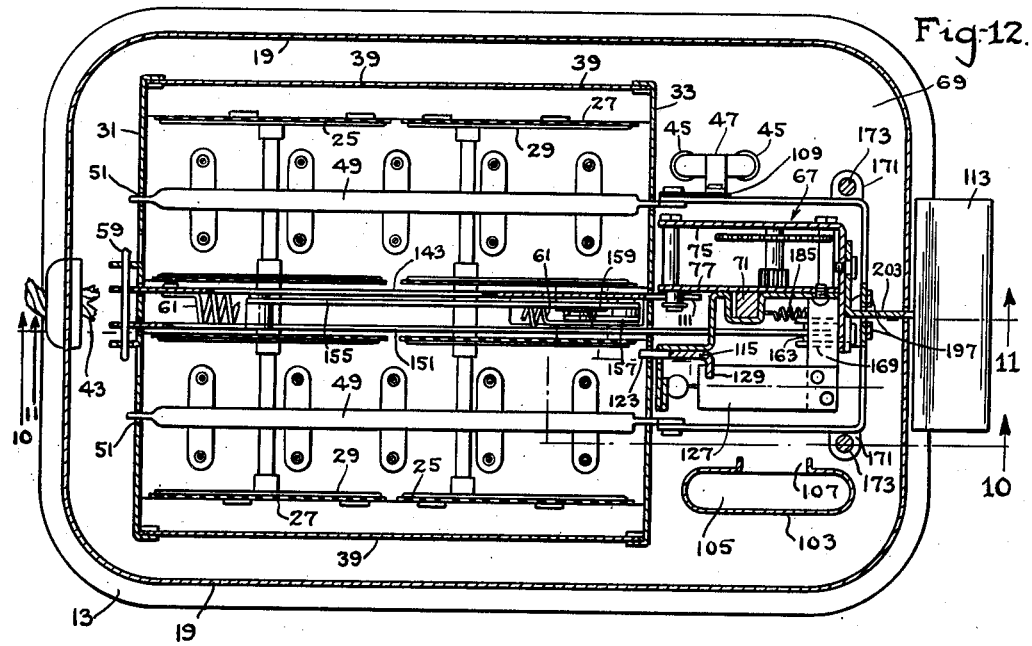
Inventor:
Murray Ireland.
By H. M. Biefel
Attorney.

Patented Apr. 9, 1940

2,196,394

UNITED STATES PATENT OFFICE 2,196,394

AUTOMATIC TOASTER

Murray Ireland, near Elgin, Ill., assignor to McGraw Electric Company, Chicago, Ill., a corporation of Delaware Application February 13, 1939, Serial No. 256,076

26 Claims. (Cl. 219—19)

My invention relates to electric cooking appliances and particularly to automatic electric toasters.

Among the objects of my invention are the following: to provide a relatively simple thermal control means for an automatic electric toaster; to provide a thermal control means in which a bimetal member is being cooled by power means during the time when a bread carrier is moved from toasting to non-toasting position; to provide a thermal timer for a toaster in which a bimetal element is heated during the first part of a toasting operation, and is cooled by power driven means during the last part of a toasting operation; to provide a relatively simple structure for first causing a thermal element to be heated to determine the duration of a toasting operation and then causing it to be quickly cooled, preferably by power driven means, at the end of a toasting operation or during the last part of a toasting operation, and further to provide a thermal timer having a single thermally actuable element and mechanical means for quickly and effectively cooling the same.

Other objects of my invention will either be apparent from the drawings accompanying the application and from a description of several forms of devices embodying my invention now preferred by me. These objects will be set forth in the appended claims which are intended to cover all variations coming within their scope.

Figure 4:
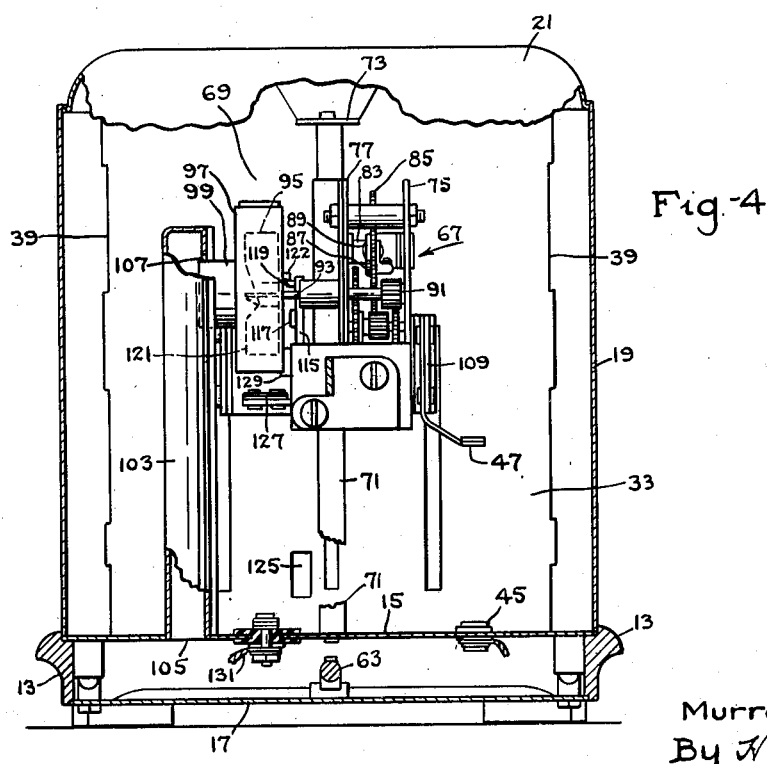
Figure 5:
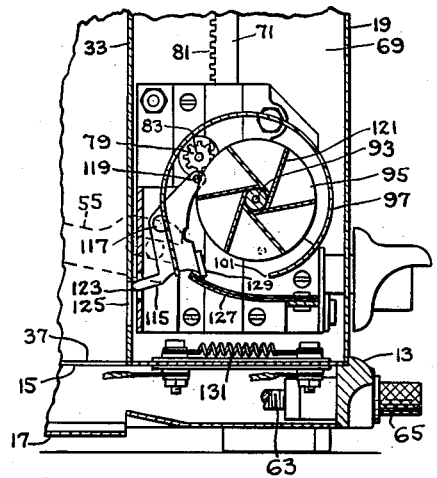
Figure 6:
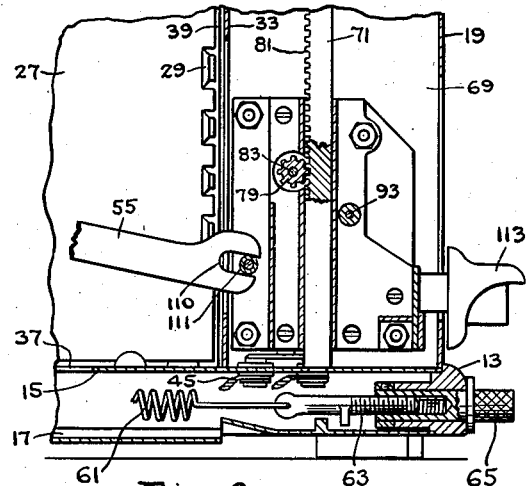
Figure 7:
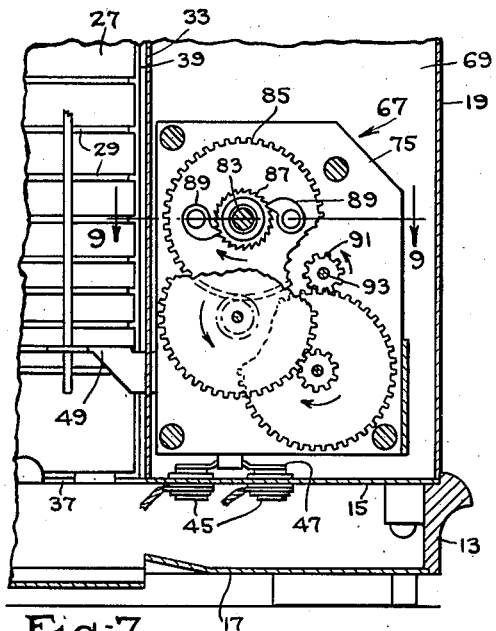
Figure 8:
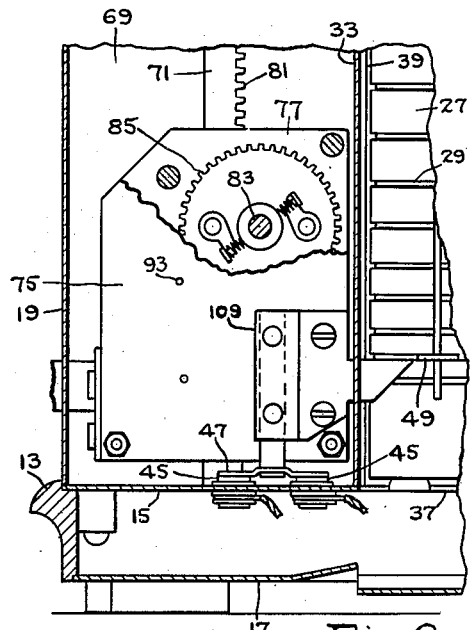
Figure 9:
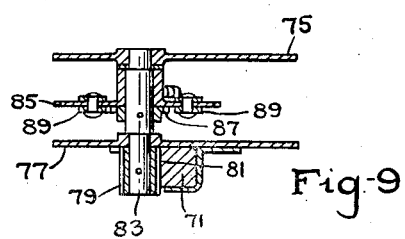

In the drawings,

Figure 1 is a vertical sectional view through one embodiment of an automatic electric toaster embodying my invention, taken on the line 1—1 of Fig. 3 and showing certain parts thereof in their non-toasting positions, Fig. 2 is a fragmentary vertical sectional view, taken on the line 2—2 of Fig. 3 and showing certain parts in the positions occupied by them during a toasting operation, Fig. 3 is a horizontal sectional view thereof, taken on the line 3—3 of Fig. 2, the parts being shown in toasting position, Fig. 4 is a front elevational sectional view, taken on the line 4—4 of Fig. 3, the parts being shown in non-toasting position, Fig. 5 is a fragmentary vertical sectional view showing the front part of the toaster shown in Fig. 2, the parts being shown at the end of a toasting period but before the movable parts have moved from their toasting positions, Fig. 6 is a fragmentary vertical sectional view of the front portion of the toaster, taken on the line 6—6 of Fig. 3, the parts being shown in toasting positions, Fig. 7 is a fragmentary enlarged view, taken on the line 7—7 of Fig. 3, the parts being shown in toasting position, Fig. 8 is a fragmentary enlarged view, taken on the line 8—8 of Fig. 3, with the parts in toasting position, Fig. 9 is a fragmentary enlarged view taken on the line 9—9 of Fig. 7, showing pawl and ratchet details in horizontal section, Fig. 10 is a vertical sectional view through another embodiment of my invention, taken on the line 10—10 of Fig. 12 and showing the parts in non-toasting position, Fig. 11 is a vertical sectional view taken on the line 11—11 of Fig. 12, showing the parts in the positions occupied by them at the start of a toasting operation, Fig. 12 is a horizontal sectional view taken on the line 12—12 of Fig. 11, the parts being shown in toasting position, Fig. 13 is a fragmentary view in exploded perspective showing certain cooperating parts, but disassembled from each other, Fig. 14 is a fragmentary view showing one form of control means which I may use for varying the duration of a toasting operation, and Fig. 15 is a wiring diagram showing the main heating elements of a toaster connected in series electric circuit with an auxiliary electric heater for the thermostatic timer element and with an adjustable rheostat.

It is well known in the automatic electric toaster art that it is possible to properly time the duration of a toasting operation either by using a plurality of thermal elements in alternate sequence or by using a single thermal element. When a plurality of such elements are used, those thermal elements not actually engaged in timing the duration of a toasting operation may cool, so that it is possible to use such a toaster for quick successive operations. When a single thermal element is used, it is possible to obtain proper operation thereof with quickly succeeding toasting operations, but to do so it is necessary that some means be provided to quickly cool the thermal element either during the toasting operation or in the short time which may elapse between the completion of one toasting operation and the start of the next succeeding toasting operation.

My present invention relates to a thermal timer using a single thermal element in combination with positive power driven means for quickly and effectively cooling the thermal element in a relatively short time and I have elected to illustrate and describe the same in connection with an automatic electric toaster assembly 11. This assembly includes some form of base structure 13, shown as being made of molded composition and having a base plate 15 of thin sheet metal, secured thereto at its upper surface in a manner now well known in the art. A crumb tray 17 is also provided, in frame 13, in a manner now well known in the art. The assembly includes also a casing 19 which may have an open bottom and an open top and which has associated therewith a cover 21 all in a manner well known in the art.

The assembly 11 shows a toaster designed and arranged to simultaneously toast two slices of bread 23 (see Fig. 2) and I provide two pairs of vertically-extending planar heating elements 25. These heating elements individually comprise one or more sheets 27 of electric insulating material, such as mica, on which is wound a heating resistor 29, the design and construction of these heating elements being well known in the art.

The outermost heating elements 25 cooperate with a rear intermediate wall 31 and a front intermediate wall 33 to constitute a toasting chamber, partially closed at the bottom by base plate 15 and at the top by cover 21. Openings 37 in base plate 15 and openings 22 in the cover 21 permit a draft of cooling air to flow upwardly through the toasting chamber. The openings in the cover permit of the insertion into and removal of slices of bread from the toaster, to be operated on. If desired, I may also provide baffle plates 39 outside of the outermost heating units 25, although I do not desire to be limited to the use of such baffle plates.

A pair of terminals 41 are mounted on the rear intermediate wall 31, suitable insulation being provided, and a twin supply conductor cord 43 is provided, all in a manner well known in the art. A switch for controlling the energization of the heating elements may include a pair of fixedly and insulatedly mounted contact members 45 carried by the base plate 15 and by a contact bridging member 47 (see Figs. 4 and 8), the operation of which will be hereinafter set forth in detail.

I provide also bread carriers 49, of a kind now well known in the art, which are vertically movable in the space between each pair of cooperating heating elements 25. These carriers have rear end portions extending through slots 51 in the rear intermediate wall 31 and forward portions extending through similar slots in the front intermediate wall 33.

Means for biasing the control switch for the heating elements to open position and for biasing the bread carriers 49 to their upper or non-toasting position may include a bellcrank lever 53 having a long and substantially horizontally extending arm 55 and a shorter depending arm 57. The bellcrank lever 53 is pivotally mounted at 59 on the rear intermediate wall 31. One end of a biasing spring 61 is connected to the lower end of arm 57 and its other end is connected to an adjusting screw 60 which extends through the frame 13 and has an adjusting knob 65 mounted thereon outside of the frame for manual adjustment, turning movement of knob 65 varying the tension on spring 61.

A gear train assembly 67 is vertically movable in a mechanism chamber 69 which is provided by a space left for that purpose between the front intermediate wall 33 and the front wall of casing 19. A single vertical standard 71 is positioned in the mechanism chamber and, as shown particularly in Figs. 4 and 9 of the drawings, may be of polygonal shape for a purpose to be hereinafter set forth. The upper end of standard 71 is held by a top bracket 73, shown more particularly in Figs. 1 and 4 and the lower end may be supported by base 15, but any suitable or desired construction of such positioning bracket may be utilized by me.

The gear train assembly 67 includes frame plates 75 and 77 within which there are positioned a number of rotatable meshing pinions and gears. A pinion 79 is mounted between these frame plates to mesh with a plurality of teeth 81 formed in one face of standard 71. The pinion 79 and a ratchet wheel 87 are keyed on a shaft 83 supported by the frame plates, 75 and 77, said shaft having loosely mounted thereon a gear wheel 85 that is associated with a ratchet wheel 87 and a pair of pawls 89, in order that the gear train assembly 67 may be moved in one direction without causing turning movement of the gear train but so that movement of the assembly in another direction will have certain results hereinafter set forth. As has already been set forth hereinbefore, the gear train assembly includes, in addition to the pinion 79, a plurality of meshing gears and pinion ending in a pinion 91 on a shaft 93, on which shaft there is mounted a blower 95. The gear train assembly includes also a suitable housing 97 for the blower 95 and the design, construction and arrangement of the blower and of its housing is such that when the blower is rotated, it draws air in, in an axial direction, through a tubular inlet member 99 on the housing and to discharge it through an opening 101 in said housing which opening is located at substantially the bottom portion thereof.

Means to permit of the movement of substantially cool air, irrespective of whether the blower is in its lower position, that is the toasting position, or in its upper or non-toasting position, or in any intermediate position, includes a vertically extending housing 103 of substantially tubular shape (see Fig. 3) which tubular housing is positioned over an opening 105 in base plate 15. This tubular housing has an elongated opening 107 into which opening the tubular member 99 is adapted to fit in such manner that the tubular member 99 may be moved relatively to the fixed cold air tube 103 with little or no friction.

It may be here pointed out that the contact bridging member 47 hereinbefore described is insulatedly mounted on and carried by a bracket 109 secured to a part of the gear train assembly 67.

The two bread carriers are also secured to the gear train assembly in a manner which is illustrated more particularly in Fig. 3 of the drawings, this of course showing one method of mounting and securing the two parts together. The front end of the long arm 55 of bellcrank lever 53 is provided with a slot 110 therein (see Fig. 6) in which slot there moves a pin 111, which pin is fixedly secured to a part of the assembly 67 in a manner now well known in the art to permit of vertical movement of the assembly 67 with accompanying angular movement of the bellcrank lever 53. Fig. 1 shows the normal or non-toasting positions of the movable parts, and the carriage 67 may have associated therewith an actuating knob 113 by means of which an operator may move the assembly downwardly into toasting position (shown in Fig. 2), contact bridging member 47 being adapted to engage the fixed contact members 45 and the bread carriers 49 being moved into toasting position with attendant tensioning of spring 61 to cause a return of the movable parts to their normal or non-toasting position upon the expiration of a toasting operation.

Means for holding the gear train assembly 67 in its lowered position may include a pivotally mounted detent member 115 which is of generally rectangular shape as shown particularly in Figs. 2 and 5 of the drawings. Member 115 is pivotally mounted at 117 intermediate its ends and its upper part is provided with a pin 119 extending laterally thereof, which pin may move into the path of travel of a pin 122 projecting from the disc or plate blower 95 (see Figs. 2, 3 and 5) for a purpose to be hereinafter set forth. The lower portion of the detent 115 is provided with a lug 123 adapted to engage and rest against the front surface of the front intermediate wall 33 for the greater part of its vertical travel, a slot 125 being provided near the lower end of the front wall 33, into which lug 123 may move. The position of the detent member 115, when extension 123 is in slot 125, is shown more particularly in Fig. 2 of the drawings and it will be noted that pin 119 is in the path of travel of the pins 22 of the blower. The design and arrangement of the pawl and ratchets hereinbefore described and of the entire gear train, ending in the blower 95, is such that the spring 61 acts upon the gear train structure to cause rotation of the blower 95 in a counter-clockwise direction with upward movement of the gear assembly. Rotary movement of the blower when it and the gear train assembly and associated parts are in the lowermost position is prevented by reason of the fact that pin 119 is in the path of travel of the pin 122 of the blower vanes so that upward movement of the gear train assembly and consequent rotary movement of the blower is prevented so long as extension lug 123 is in slot 125, impelled thereinto by gravity.

Means for causing releasing movement of detent 115 includes a bimetallic element 127, supported on a part of the gear train assembly 67, the movable end of which is adapted to engage an extension 129 on detent 115 and turn the detent in a counterclockwise direction as shown for instance in Fig. 5 of the drawings.

Means for thermally energizing the bimetal element 127 includes a small auxiliary electric heater 131 fixedly and insulatedly mounted on the base plate 15 in a position to be adjacent to and below the bimetal element 127 when the latter has been moved to its lowermost position with the assembly 67, which lowermost position is that when a slice of bread is being toasted.

The auxiliary heating element 131 is controlled by the contact bridging member 47 cooperating with the fixed contact members 45, that is the auxiliary electric heating element 131 is energized simultaneously with the main heating elements 25.

The operation of the device hereinbefore described and illustrated in Figs. 1 to 9 inclusive is substantially as follows: If it is desired to toast slices of bread 23, they are inserted in opening 27 at the top of the toaster to rest upon the carriers 49 and assuming that the toaster is connected by the cord 43 to a suitable source of supply of electric energy, the operator presses on knob 113 to move it from substantially the position shown in Fig. 1 of the drawings to that shown in Figs. 2, 3 and 5. Energization of the main and of the auxiliary electric heaters is effected by engagement of the contact bridging member 47 with the fixed contact 45 and as has already been set forth hereinbefore, the gear train assembly 67 may be moved in a downwardly direction without causing rotary movement of the blower 95, this being because of the construction of the ratchet wheel 87 and the pawls 89 above described. The thermal element 127 and the auxiliary electric heating element 131 are so designed, constructed and adjusted that the bimetal element 127 will flex in a generally clockwise direction (see Fig. 5) and by the time that the slices of bread have been properly toasted to the desired degree the detent member 115 will have been moved to the position shown in Fig. 5 of the drawings. It will be noted, by reference to Fig. 5, that extension 123 has been moved out of the slot 125 and that its extreme outer end is in substantially the plane of the front surface of front intermediate wall 33 so that it no longer acts as a detent. At the same time pin 119 has been moved out of the path of the rotary travel of the pin 122 so that the blower may rotate under the influence of the force exerted thereon by spring 61. This spring 61 acts, as has already been stated, to cause upward movement of the assembly 67, which upward movement causes rotation of the blower 95.

The rotating blower 95 draws cool air in from the bottom of the toaster through opening 105 and into the vertical tube 103 and blows it directly against the upper surface of bimetal member 127 whereby the latter is quickly and effectively cooled. Contact bridging member 47 is of course moved out of engagement with contacts 45 very shortly after the beginning of the upward movement of assembly 67 whereby auxiliary heating element 131 is deenergized so that it also cools to some degree.

I may mention that the length of time required for the upward movement of the assembly 67 may be made variable by means of the adjusting screw 63 and may be on the order of five to ten seconds or more. It is obvious that the length of time required to cool the bimetal element to a relatively low temperature, will be very short because of the relatively large stream of air moved by the rotary blower, to which may be added the fact that relatively cool air is available to be moved by the blower irrespective of its vertical position in the toaster casing, since the air moved by the blower is drawn from the outside of the toaster.

Referring now to Figs. 10 to 15 inclusive, I have there illustrated a modification of the device shown in Figs. 1 to 9 inclusive. More particularly the device shown in Figs. 10 to 15 inclusive differs from that shown in Figs. 1 to 9 inclusive by having two vertically reciprocally movable structures positioned in the mechanism chamber for a purpose which will hereinafter appear.

Only such parts of the structure as are new or different from that shown in the earlier figures of the drawings will be described.

The gear assembly and blower structure is substantially the same as has hereinbefore been described and no further description thereof is believed to be necessary. Instead of the bread carriers 49 being directly connected to and with the gear assembly and blower they are connected to a separate vertically movable structure hereinafter to be described. The gear train assembly is vertically movable on a rack bar 71 as has already been described.

Instead of the single bellcrank lever used in the other embodiment shown in the drawings I here use a compound lever system including a first bellcrank lever 141 including a substantially horizontally extending longer arm 143 and a depending arm 145 pivotally mounted at 59 on the rear intermediate wall 31. The forward end of arm 143 is slotted as at 147 in which slot a pin 111 mounted on the gear train assembly is adapted to move so that vertical movement over the gear train assembly 67 is accompanied by turning movement of bellcrank lever 141. The lower end of depending arm 145 has one end of a tension spring 61 connected thereto.

A second bellcrank lever 149 is also pivotally mounted at 59 and includes a substantially horizontally extending longer arm 151 having a shorter arm 153 extending thereabove at substantially right angles to the general direction of arm 151. A link 155 has one end thereof connected to the outer end of arm 153 while its other end is connected to one arm of a bellcrank lever 157, the other arm of which has its outer end connected with the other end of tension spring 61. The bellcrank lever 157 is pivotally mounted on one or more brackets 159. The forward end of arm 151 is slotted as at 161 in which slot a pin 163 may move.

The forward ends of bread carriers 49 are connected to a frame 165 which may be of substantially rectangular shape having however only three sides, pin 163 being secured to the forward portion 167 thereof by a bracket 169 as will be noted more particularly from Fig. 13 of the drawings. It is thus evident that vertical movement of the frame 165 is accomplished by a turning movement of arm 151.

Frame 165 has a pair of apertured lugs 171 at the sides of each front corner thereof, vertical standards 173 fitting into the apertured lugs in order to permit of the desired vertical movements of the bread carriers and of the frame.

Bracket plate 175 (see Fig. 10) has its rear end suitably secured to the upper end of the front intermediate plate 33, the upper ends of standards 173 fitting into apertures in plate 175 as does also the upper end of vertical rack bar 71 in order to maintain these upper ends in the desired operative positions. The lower ends of the standards 173 are adapted to fit into apertures in the bottom plate 15.

A contact bridging member 47 is insulatedly supported on frame 165 and cooperates with fixed contacts 45 to control the energization of the toaster.

A detent member 177 of the general shape shown in Fig. 13 of the drawings is pivotally supported as by a pin 179 supported in a pair of brackets 181 (see Fig. 13). The lower end of spring detent 177 has a short lateral extension 183 thereon into which one end of a tension spring 185 may fit, the other end of said spring engaging either the lower end of vertical standard 71 or of some other fixed abutment whereby spring detent 177 is maintained in the position shown more particularly in broken lines in Fig. 10 and in full lines in Fig. 11.

A thermal element here shown as a bimetal bar 127 is mounted on and carried by the gear train assembly 67 in substantially the same manner as has already been hereinbefore set forth for the embodiment shown in Figs. 1 to 9 inclusive. A stationary auxiliary heater 187 is insulatedly supported by and on two pillars 189 in order to position it in proper heat-transmitting relation relatively to the bimetal element 127 when gear train assembly 67 and the bimetal bar 127 are in their lowermost position at which time the bread carriers 49 are in their lowermost or toasting position.

I may provide some form of means for adjusting the thermal effect of the auxiliary heaters 131 or 187 on the thermally actuable element 127 and have elected to show an adjustable rheostat 191 which may be of any suitable or desired character, shown in Fig. 14 as including an extended resistor having associated therewith a movable contact 193 which contact is adjustable being a push-pull knob 195 positioned on the outside of the toaster. It will be noted that (as may be seen in Fig. 15) the adjustable rheostat 191 will act to vary the amount of current traversing the auxiliary heating resistor 187 whereby the degree of heating effect on thermal element 127 produced by heater 187 may be varied within the desired or required limits.

The operation of the device shown in Figs. 10 to 15 inclusive is substantially as follows. The actuating knob 113 is connected as before with the gear train assembly 67. Downward pressure on knob 113 causes downward movement of not only the gear train assembly and blower but also of frame 165 and therefore of the bread carriers 49. The normal, inoperative, or non-toasting positions of the various parts are shown in Fig. 10 of the drawings while the same parts are shown in their toasting or operative positions in Fig. 11 of the drawings. It will be noted that an upstanding part 197 of frame 165 is adapted to engage an offset portion 199 of detent 177, as will be seen in full lines in Fig. 10 and as is indicated in the broken lines of Fig. 11 of the drawings. When the parts are in their operative or toasting positions an electric circuit has been established by the bridging member 47 and the contacts 45 through the main heating resistor 29 and through the auxiliary heater 187 and such part of the rheostat 191 as may be connected in circuit, so that the temperature of the bimetal element 127 is raised at some predetermined rate. When the temperature of bimetal element 127 has been raised to a predetermined value and the free end of the bar 127 has moved upwardly, in substantially the manner as is shown in Fig. 5 of the drawings, the free end thereof will engage detent 115 to cause disengagement of pin 119 from the pin 122 permitting slow upward movement of the gear train assembly 67 on standard 71, caused by spring 61. It will be noted however that the bread carriers and frame 165 are still retained in toasting position because of the interlocking action between detent portion 199 and part 197 of the frame 165, so that the main and the auxiliary heaters are still energized.

At substantially the upper limit of the vertical movement of gear train assembly 67 an arcuate surface 201 on a member 203 supporting knob 113 from assembly 67, engages an arcuate portion 205 on detent 177, causing a turning movement thereof in a counterclockwise direction around pivot pin 179 of said detent 177. This effects release of the bread carrier or carriers 49 and the remaining tension in spring 61 (or at least a part thereof) will cause upward movement of frame 165 and its associated bread carriers through the mechanism of the lever and link structure hereinbefore described. This upward movement of frame 165 causes deenergization of the toaster and termination of the toasting operation.

It will thus be noted that while in the device shown in Figs. 1 to 9 inclusive the bread carriers move upwardly with the gear assembly, in the device shown in Figs. 10 to 15 the gear assembly alone moves upwardly, driving the blower and causing a draft of cooling air to be directed against the bimetal element 127 while the energization of the electric circuit including the main heating element 29 and the auxiliary electric heater 127 is still continued. This of course means that toasting of a slice or slices of bread positioned in the toaster will continue during the cooling action of the blower on the thermal timer. Whereas in the structure shown in Figs. 1 to 9 the forced air draft cooling of the thermal timing member is effected after the termination of a toasting operation, in the structure shown in Figs. 10 to 15 inclusive the forced air draft cooling of the thermal timer is effected during the toasting interval near the end thereof. It is therefore evident that the structure shown in Figs. 10 to 15 inclusive will permit of building a toaster with a greater output over a given time interval because of the fact that the thermal timer is cooled simultaneously or during the last part of a given toasting operation.

It is of course obvious that it is possible to so correlate the cooling effect and the length of time during which the stream of cooling air is acting upon the thermal element that no compensating means in the form of a second thermal element is necessary. However, it is within the scope of my invention to add such a means if desired.

While I have illustrated and described certain details of construction of electric toasters embodying my invention, I do not desire to be limited thereto as obvious modifications are to be considered as being covered by the appended claims.

I claim as my invention:

1. An automatic electric toaster including a heating element, means for initiating a toasting operation and means for terminating a toasting operation, said terminating means comprising a thermal timing means and a power driven means controlled by said thermal timing means for air cooling said thermal timing means after it has reached a predetermined high temperature.

2. An automatic electric toaster including a heating element, means for initiating a toasting operation and means for terminating a toasting operation, said terminating means including a thermal timing means for determining the duration of a toasting operation and power driven means controlled by said thermal timing means for rapidly cooling said thermal timing means after it has been heated to a predetermined high temperature by forcing a stream of cooling air in a directed path against said thermal timing means.

3. An automatic electric toaster including a heating element, means for initiating a toasting operation and means for terminating a toasting operation, said terminating means including a thermal timing means for determining the duration of a toasting operation, power drven means controlled by said thermal timing means for subjecting said thermal timing means to a directed stream of cooling air after it has been heated to a predetermined high temperature and means for conducting air from the outside of the toaster to said power driven means in a defined path.

4. An automatic electric toaster including a heating element, means for initiating a toasting operation and means for terminating a toasting operation, said terminating means including a thermal timing means for determining the duration of a toasting operation and power driven means for rapidly cooling said thermal timing means after it has been heated to a predetermined high temperature, said power driven cooling means being released for operation by said thermal timing means.

5. An automatic electric toaster including a heating element, means for initiating a toasting operation and means for terminating a toasting operation, said terminating means including a thermal timing means for determining the duration of a toasting operation and power driven blower means controlled by said thermal timing means for rapidly cooling said thermal timing means substantially simultaneously with the initiation of the termination of a toasting operation.

6. An automatic electric toaster including a heating element, means for initiating a toasting operation and means for terminating a toasting operation, said terminating means including a thermal timing means for determining the duration of a toasting operation and normally inoperative power driven blower means for rapidly cooling said thermal timing means substantially simultaneously with the termination of a toasting operation, said power driven blower means being released for operation by said thermal timing means.

7. An automatic electric toaster including a heating element, means for initiating a toasting operation and means for terminating a toasting operation, said terminating means including a thermal timing means for determining the duration of a toasting operation, a reciprocally movable power driven blower for rapidly cooling said thermal timing means substantially simultaneously with the termination of a toasting operation and means for causing energization of the power means of said blower by movement of said blower in one direction.

8. An automatic electric toaster comprising a main and an auxiliary heating element, a bread carrier reciprocally movable into toasting and non-toasting position relatively to said main heating element, spring means normally biasing said bread carrier into non-toasting position, means to move said bread carrier into toasting position, a detent controlled in accordance with the position of said bread carrier for holding the latter in toasting position, a thermally-actuable member adapted to be subjected to heat from said auxiliary heating element during the time that the bread carrier is in toasting position and effective when heated to a predetermined temperature to cause releasing movement of said detent and return of said bread carrier to non-toasting position and mechanical means operatively supported by said bread carrier for cooling said thermally-actuable member during the return movement of the bread carrier.

9. An automatic electric toaster comprising a heating element, a control switch therefor, a gear train and blower structure movable from one to another of two opposed limiting positions, a single spring for biasing the switch to open position and the gear train and blower structure to a first limiting position, an auxiliary heating element the energization of which is controlled by said control switch, means to move said gear train and blower structure to its second limiting position without rotation of the blower and to cause closing of said switch, a detent on said gear train and blower structure engageable with said blower when the latter is in its second limiting position to prevent movement of the gear train and blower therefrom and a thermally-actuable element on said gear train and blower structure positioned in heat receiving relation relatively to said auxiliary heating element when the gear train and blower structure are in the second limiting position and effective to move said detent out of engagement with said blower when heated to a predetermined temperature by said auxiliary heating element to cause movement of said gear train and blower structure to the first limiting position with attendant rotation of the blower and cooling thereby of the thermally-actuable element.

10. An automatic electric toaster comprising a main and an auxiliary electric heating element, a switch for controlling the energization of said heating elements, a blower movable reciprocally between two opposed limiting positions, a single means to yieldingly bias the blower to a first limiting position and the switch to open position, means to move said blower to its other limiting position and to simultaneously close said switch, a detent movable with the blower and controlled in accordance with the position of said blower and operatively engageable therewith when the blower is in its second limiting position to prevent movement thereof from said second limiting position and a bimetal element movable with said blower and subjected to heat from said auxiliary heating element when the blower is in its second limiting position and effective when it has been heated to a predetermined temperature to move said detent and cause return movement of the blower to its first limiting position, rotation of the blower and cooling thereby of said bimetal element.

11. An automatic electric toaster comprising a heating element, a control switch therefor, a blower, means normally biasing said blower to a first limiting position and said control switch to open position, means to move said blower to a second limiting position without rotary movement thereof and to cause closing of said control switch, a detent operatively engageable with said blower when the latter is in its second limiting position to prevent movement of said blower, a thermally-actuable member effective when heated to cause release movement of said detent, rotary movement of said blower and cooling thereby of said thermally-actuable element and an auxiliary electric heating element in heat transmitting relation relatively to said thermally-actuable member to heat the same when the blower is in its second limiting position.

12. An automatic electric toaster comprising a main heating element, a control switch therefor, a blower structure, means normally yieldingly biasing said blower structure to a first limiting position and said control switch to open position, means to move said blower structure to a second limiting position without rotary movement thereof and to cause closing of said control switch, a detent actuable in accordance with the position of said blower structure operatively engageable with said blower when the latter is in its second limiting position to hold the blower structure therein, a bimetal member mounted on said blower structure and operable when heated to cause disengaging movement of said detent, movement of said blower structure to its first limiting position and rotary movement of said blower to cool said bimetal member and an auxiliary electric heating element in heat-transmitting relation to said bimetal member when the blower structure is in its second limiting position.

13. An automatic electric toaster comprising a heating element, a bread carrier reciprocally movable into toasting and non-toasting positions relatively to said heating element, a blower structure operatively connected to said bread carrier to move simultaneously therewith, means normally biasing said bread carrier into non-toasting position and said blower structure into a first limiting position, means to move said bread carrier into toasting position and said blower structure into a second limiting position without rotary movement of the blower, a detent for holding said blower structure in its second limiting position and said bread carrier in toasting position, a bimetal member on said blower structure in the path of air moved by said blower for causing release movement of said detent, when heated to a given temperature, return movement of said bread carrier to non-toasting position, rotary movement of said blower and cooling of said bimetal member and an auxiliary heating element in heat transmitting relation to the bimetal member when the blower structure is in its second limiting position.

14. An automatic electric toaster comprising a main and an auxiliary heating element, a bread carrier movable into toasting and non-toasting positions relatively to said main heating element, a spring to yieldingly hold the bread carrier in non-toasting position, means to move the bread carrier into toasting position, a detent to hold the bread carrier in toasting position, a thermal element subjected to heat from the auxiliary heating element when the bread carrier is in toasting position and effective on being heated to a predetermined temperature to cause releasing movement of said detent, and means including a blower driven by said spring when moving the bread carrier to non-toasting position for cooling said bimetal element.

15. An automatic electric toaster comprising a main and an auxiliary heating element, a bread carrier movable into toasting and non-toasting positions relatively to said main heating element, a spring to yieldingly hold the bread carrier in non-toasting position, means to move the bread carrier into toasting position, a detent to hold the bread carrier in toasting position, a bimetal element subjected to heat from the auxiliary heating element when the bread carrier is in toasting position and effective on being heated to a predetermined temperature to cause releasing movement of said detent, and means including a blower operatively mounted on said bread carrier and caused to rotate by said spring when moving the bread carrier to non-toasting position to cool the bimetal element.

16. An automatic electric toaster comprising a main and an auxiliary heating element, a bread carrier movable into toasting and non-toasting positions relatively to said main heating element, a spring to yieldingly hold the bread carrier in non-toasting position, means to move the bread carrier into toasting position, a detent to hold the bread carrier in toasting position, a bimetal element operatively supported by the bread carrier and adapted to be moved into heat receiving relation to the auxiliary heating element when the bread carrier is in toasting position and effective on being heated to a predetermined temperature to cause releasing movement of said detent and means including a blower driven by said spring when moving the bread carrier to non-toasting position for cooling said bimetal element.

17. An automatic electric toaster comprising a main and an auxiliary electric heater, a control switch for said heaters, a bread carrier movable into toasting and non-toasting positions relatively to said main heating element, a single spring for normally holding said switch in open position and said bread carrier in non-toasting position, means to move the switch to closed position and the bread carrier to toasting position, a plurality of detents for holding said bread carrier in toasting position and the switch in closed position, a bimetal member operatively supported by the bread carrier and positioned in heat-receiving relation to said auxiliary heater for causing releasing movement of one of said detents when the temperature of the bimetal member has reached a predetermined high value and means including a blower mounted on and movable with said bread carrier and caused to rotate by said spring when moving the bread carrier to its non-toasting position for cooling said bimetal member.

18. An automatic electric toaster comprising a main and an auxiliary electric heater, a bread carrier movable into toasting and non-toasting position relatively to said main heater and spring biased to non-toasting position, a rack bar, a gear train and blower structure reciprocally movable on said rack bar and having a pinion meshing therewith, a detent carried by the gear train and blower structure for holding the same in a position where the bread carrier is in toasting position, a bimetal member carried by the gear train and blower structure, positioned in heat receiving relation to the auxiliary heater when said structure is held by the detent and effective to cause a releasing movement of said detent when heated to a predetermined temperature to cause return movement of the gear train and blower structure with rotation of the blower during such return movement to effect cooling of the bimetal member.

19. An automatic electric toaster comprising a casing, a main and an auxiliary electric heater, a bread carrier reciprocally movable into toasting and non-toasting positions relatively to said main electric heater, a rack bar, a gear driven blower structure reciprocally movable on said rack bar and supporting said bread carrier, a spring normally biasing said bread carrier to non-toasting position and said blower structure at one end of its movement, means for moving said blower structure to the other end of its movement without causing rotation of the blower and the bread carrier to toasting position, a detent on said blower structure adapted to operatively engage said blower when it is at said other end of its movement to prevent movement of said blower, blower structure and bread carrier, a bimetal element on said blower structure and in the path of air moved by said blower, moved into heat-receiving relation relatively to said auxiliary electric heater when the blower structure is at said other end of its movement and effective when heated to a predetermined temperature to cause release of said detent return of the bread carrier to non-toasting position and return of the blower structure to said one end of its movement, the blower being energized by said spring during said return movement to subject the bimetal element to a flow of cooling air.

20. A device as set forth in claim 13 and including a conduit opening to the outside air so positioned relatively to said blower as to conduct thereto relatively cool air from the outside of the casing when said blower is operating.

21. An automatic electric toaster comprising fixed main and auxiliary electric heaters, a bread carrier reciprocally movable into toasting and non-toasting positions relatively to said main heater, means to bias said bread carrier to non-toasting position, means to move said bread carrier to toasting position, a detent carried by said bread carrier to hold said bread carrier in toasting position, a bimetal member carried by said bread carrier positioned in heat receiving relation to said auxiliary electric heater when the bread carrier is in toasting position and adapted to cause release of said detent when heated to a predetermined temperature, means including said biasing means for causing movement of said bread carrier to non-toasting position and for subjecting said bimetal member to a confined stream of cooling air during such movement.

22. An automatic electric toaster comprising a main and an auxiliary electric heater, a gear train and blower assembly movable from one to another of two opposed limiting positions, a bread carrier movable into toasting and non-toasting positions relatively to the main electric heater, a single spring for biasing the assembly to one limiting position and the bread carrier to non-toasting position, means for simultaneously moving the assembly to its other limiting position and the bread carrier to toasting position and to energize said main and auxiliary heaters, a first detent for holding the assembly in its other limiting position, a second detent for holding the bread carrier in toasting position, a bimetal element mounted on said assembly subjected to heat from the auxiliary electric heater when the assembly is in its other limiting position and effective when it has been heated to a predetermined temperature to effect release of said first detent, return of the assembly to its first limiting position and spring-actuated operation of said blower to subject said bimetal element to a stream of cooling air, and means on said assembly for effecting release of said second detent when the assembly approaches its first limiting position.

23. An automatic electric toaster including a heating element, means for initiating a toasting operation and means for terminating a toasting operation, said terminating means comprising a thermal timing means including a single thermosensitive element and a power-driven blower controlled by said thermosensitive element for forcing a directed stream of cooling air against said thermosensitive element when it has been heated to a predetermined high temperature.

24. In an automatic electric toaster comprising a main and an auxiliary heating element, a bread carrier reciprocally movable into toasting and non-toasting position relatively to said main heating element, spring means normally biasing said bread carrier into non-toasting position, means to move said bread carrier into toasting position, a detent controlled in accordance with the position of said bread carrier for holding the latter in toasting position, a thermally-actuable member adapted to be subjected to heat from said auxiliary heating element during the time that the bread carrier is in toasting position and effective when heated to a predetermined temperature to cause releasing movement of said detent and return of said bread carrier to non-toasting position and a blower operatively supported by said bread carrier and driven by said biasing spring for directing a stream of cooling air against said thermally actuable member during the return movement of the bread carrier.

25. An automatic electric toaster comprising a main and an auxiliary electric heater, a front intermediate wall constituting one wall of a toasting chamber, a bread carrier vertically movable in said toasting chamber into toasting and non-toasting positions relatively to said main electric heater, spring means yieldingly biasing said carrier into non-toasting position, means to move said bread carrier into toasting position, a thermally-actuable timing means for determining the length of time during which the bread carrier remains in toasting position and operatively supported by the bread carrier, a gear train and blower structure operatively supported by the bread carrier, a detent operatively supported by the bread carrier, normally held out of blower-engaging position by said front intermediate wall and movable into blower-engaging position to hold the bread carrier in toasting position when the bread carrier has been moved into toasting position, the thermally-actuable timing means being heated by said auxiliary heater and causing releasing movement of the detent from the blower when heated to predetermined temperature and means to cause said spring to drive said blower to direct a stream of cooling air against the thermal timing means during the return movement of the bread carrier to non-toasting position.

26. An automatic electric toaster comprising an electric heater, a toasting chamber structure, a bread carrier movable into toasting and non-toasting position relatively to the electric heater, spring means yieldingly biasing the bread carrier into non-toasting position, means to move the carrier into toasting position, a detent operatively supported by the carrier, means comprising a part of the toasting chamber structure for normally holding the detent in inoperative position and for causing it to hold the carrier in toasting position when the carrier has been moved thereto, a thermal element operatively supported by the bread carrier and constructed and arranged to be heated during at least a part of the time that the bread carrier is in toasting position and effective when heated to a predetermined temperature to cause releasing movement of the detent and return of the bread carrier to non-toasting position, a blower operatively supported by the bread carrier and means including said biasing spring means for causing said blower to subject said thermal element to a directed stream of cooling air during the return movement of the carrier to non-toasting position.

MURRAY IRELAND.